US012618527B2

(12) United States Patent
White

(10) Patent No.: US 12,618,527 B2
(45) Date of Patent: May 5, 2026

(54) PRESSURE VESSEL INCORPORATING RAPID, TOOLLESS ASSEMBLY AND DISASSEMBLY

(71) Applicant: Prototype Garage, LLC, Little Canada, MN (US)

(72) Inventor: Greg White, Hugo, MN (US)

(73) Assignee: Prototype Garage, LLC, Little Canada, MN (US)

( * ) Notice: Subject to any disclaimer, the term of this patent is extended or adjusted under 35 U.S.C. 154(b) by 0 days.

(21) Appl. No.: 17/565,387

(22) Filed: Dec. 29, 2021

(65) Prior Publication Data

US 2022/0205593 A1 Jun. 30, 2022

Related U.S. Application Data

(60) Provisional application No. 63/132,691, filed on Dec. 31, 2020.

(51) Int. Cl.
*F17C 13/06* (2006.01)
*F17C 1/00* (2006.01)

(52) U.S. Cl.
CPC ................ *F17C 13/06* (2013.01); *F17C 1/00* (2013.01); *F17C 2201/0119* (2013.01); *F17C 2205/0311* (2013.01); *F17C 2221/013* (2013.01); *F17C 2223/0115* (2013.01); *F17C 2223/036* (2013.01); *F17C 2270/05* (2013.01)

(58) Field of Classification Search
CPC .... F17C 13/06; F17C 1/00; F17C 2201/0119; F17C 2205/0311; F17C 2221/013; F17C 2223/0115; F17C 2223/036; F17C 2270/05
USPC ................................ 220/315, 316, 323, 582
See application file for complete search history.

(56) References Cited

U.S. PATENT DOCUMENTS

| | | | | |
|---|---|---|---|---|
| 2,196,895 | A | 4/1940 | Bowman | |
| 2,989,209 | A | 6/1961 | Hersman | |
| 3,107,810 | A | 10/1963 | King | |
| 3,667,649 | A * | 6/1972 | Thillet | F17C 13/06 292/256.65 |
| 4,102,474 | A | 7/1978 | Platts | |
| 4,489,850 | A | 12/1984 | Reneau | |
| 4,974,781 | A | 12/1990 | Placzek | |

(Continued)

*Primary Examiner* — Laura E. Parker
(74) *Attorney, Agent, or Firm* — O'Connor & Company; Ryan P. O'Connor

(57) ABSTRACT

Some variations provide a pressure vessel comprising: a chamber for processing a material under a chamber pressure up to 5000 bar; an end cap disposed at one end of the pressure chamber; an interior seal plate disposed between the end cap and the chamber volume; and a plurality of pressure-vessel keys disposed between the end cap and an outer ring. At a chamber pressure greater than atmospheric, the end cap exerts a force against the keys to automatically and reversibly actuate a pressure-vessel seal. Conversely, at atmospheric pressure or less, the keys and end cap are easily removable. Essentially, the pressure in the vessel is utilized as an in situ mechanical force to automatically actuate a safe and efficient seal. Process cycle times are significantly reduced because the vessel is not opened and closed using tooling. Throughputs are increased, improving economics of pressure vessels for extraction, reaction, or other processes.

9 Claims, 8 Drawing Sheets

(56) References Cited

U.S. PATENT DOCUMENTS

| | | | | |
|---|---|---|---|---|
| 5,127,535 | A * | 7/1992 | Shinno | F16J 13/10 220/323 |
| 5,445,329 | A | 8/1995 | Anderson | |
| 5,540,391 | A | 7/1996 | Anderson | |
| 5,647,976 | A * | 7/1997 | Rothe | B01D 11/0203 210/450 |
| 5,655,718 | A | 8/1997 | Anderson | |
| 5,879,634 | A * | 3/1999 | Ford | G01N 1/34 436/178 |
| 6,349,562 | B1 * | 2/2002 | Kaspar | F17C 13/06 62/509 |
| 6,588,690 | B1 | 7/2003 | Koenig | |
| 6,752,337 | B2 | 6/2004 | Koenig | |
| 7,739,779 | B2 * | 6/2010 | Bergman | B01J 3/03 220/582 |
| 7,802,694 | B2 | 9/2010 | Lee | |
| 9,056,701 | B1 * | 6/2015 | Haibel | B65D 45/28 |
| 2015/0323136 | A1 * | 11/2015 | Southam | F17C 13/06 49/506 |

* cited by examiner

PRESSURE VESSEL INCORPORATING RAPID, TOOLLESS ASSEMBLY AND DISASSEMBLY

PRIORITY DATA

This patent application claims priority to U.S. Provisional Patent App. No. 63/132,691, filed on Dec. 31, 2020, which is hereby incorporated by reference for all purposes.

FIELD OF THE INVENTION

The present invention generally relates to pressure vessels, and systems and methods for rapidly assembling and disassembling the pressure vessels.

BACKGROUND OF THE INVENTION

Pressure vessels have a wide variety of uses industrially, including reaction, extraction, separation (e.g. distillation), and storage. For example, typical carbon dioxide ($CO_2$) extraction systems require pressure vessels so that the extraction can be carried out at relatively high temperature and pressure, allowing for extraction and collection of the desired oils, etc.

Pressure vessels are historically difficult to assemble, disassemble, and access, requiring multiple tools and extended amounts of time to clean and recover the desired materials. A typical pressure vessel is constructed of a thick-walled stainless steel tube with a closed end. Access to the open end conventionally requires removing a top plate with either multiple bolt and nut assemblies or with a threaded cap under extreme tightening torque.

In a typical process, a batch pressure vessel is opened up using a wrench or other torque tool by loosening a plurality of bolts, such as about 10 bolts, that pass through openings at the top of the pressure vessel and are connected to nuts on an opposite side of a plate. The contents to be processed in the pressure vessel are added, and then the procedure is reversed to close and tighten the pressure vessel by tightening the bolts with the wrench or other torque tool. After the process (e.g. reaction) is completed, the pressure vessel is again opened up by loosening the bolts, in order to recover the processed contents. The process is repeated by adding fresh material and again tightening the bolts. The time required to open and close the pressure vessel can be a significant fraction of the overall cycle time and can even be longer than the reaction or extraction time itself. Such as process is clearly inefficient.

A variety of prior-art pressure-vessel closure systems have been disclosed. Representative patents include U.S. Pat. No. 3,107,810 that shows a rotatable tab system that can be used to seal a high-pressure autoclave, using lugs that are slanted in order to cause the door to seal against the frame. U.S. Pat. No. 2,989,209 discloses a flexible polygonal gasket that under pressure forms a seal in the structure. U.S. Pat. No. 2,196,895 shows a segmented structure driven by a mechanical screw mechanism, using a non-continuous segmented closure structure with a bolt-like threaded member to advance and retract each segment to make the seal. U.S. Pat. No. 4,102,474 shows an expandable door lock/closure mechanism, including a number of blocks that can be moved from a locked position to an unlocked position or from an unlocked position to a locked position. U.S. Pat. No. 4,489,850 shows a segmented seal structure that can be moved radially to seal the door, using a relatively complex pawldriven movement system. See also U.S. Pat. Nos. 4,974,781, 5,445,329, 5,540,391, 5,655,718, 6,588,690, and 6,752,337.

More recently, in U.S. Pat. No. 7,802,694 issued Sep. 28, 2010 to Lee, which is hereby incorporated by reference, a pressure vessel is disclosed for recycling solid waste and producing a usable fuel with recycle streams. The pressure in the vessel is maintained by a door that maintains effective pressure, temperature, and humidity within the vessel. The locking diameter of a locking member can be changed using a mechanically or electrically driven screw drive, solenoid, or hydraulic cylinder.

Improvements are still needed in the art of opening and closing pressure vessels. It is especially desired to overcome low throughput and recovery rates, and to improve loading and unloading capabilities, over currently available equipment and processes. A solution to these problems would have widespread applicability in industrial processes. What is especially desired is a pressure vessel that allows rapid and convenient opening and closing, preferably without requiring any tooling.

SUMMARY OF THE INVENTION

The present invention addresses the aforementioned needs in the art, as will now be summarized and then further described in detail below.

Some variations of the invention provide a pressure vessel comprising:

- a chamber configured for processing a material in a chamber volume under a chamber pressure selected from about 1 bar to about 5000 bar;
- a first end cap disposed at one end of the pressure chamber;
- a first interior seal plate disposed between the first end cap and the chamber volume; and
- a plurality of first pressure-vessel keys disposed between (a) the first end cap and (b) a first key ring configured to hold the first pressure-vessel keys in place,
- wherein at a chamber pressure greater than atmospheric pressure, the first end cap exerts a force against the first pressure-vessel keys and the first key ring to automatically and reversibly actuate a first pressure-vessel seal; and
- wherein at a chamber pressure of atmospheric pressure or less, the first pressure-vessel keys are removable from the first key ring, whereby the first end cap is consequently removable.

Preferably, the first pressure-vessel keys are removable without tooling. Preferably, the first end cap is removable without tooling. In some embodiments, the first interior seal plate is also removable without tooling.

The number of first pressure-vessel keys may be at least 2, 3, 4, 5, 6, 7, 8, 9, 10, 11, 12, 13, 14, 15, 16, 17, 18, 19, 20, or more. In some embodiments, the number of first pressure-vessel keys is at least 4, at least 8, or at least 12.

In some embodiments, at a chamber pressure of atmospheric pressure or less, the clearance between the first pressure-vessel keys and (a) the first end cap and/or (b) the first key ring is at least 0.015 inch.

In preferred embodiments, the pressure vessel comprises a first seal-plate piston seal disposed on the outside diameter of the first interior seal plate. In some embodiments, the pressure vessel further comprises a first end-cap piston seal disposed on the outside diameter of the first end cap.

In some embodiments, the first end cap and the first interior seal plate form an integrated piece.

The pressure vessel may further comprise one or more first fittings disposed within the first interior seal plate.

In some variations of the invention, the pressure vessel further comprises:

a second end cap disposed at the opposite end of the pressure chamber;

a second interior seal plate disposed between the second end cap and the chamber volume; and a plurality of second pressure-vessel keys disposed between (a) the second end cap and (b) a second key ring configured to hold the second pressure-vessel keys in place, wherein at the chamber pressure greater than atmospheric pressure, the second end cap exerts a force against the second pressure-vessel keys and the second key ring to automatically and reversibly actuate a second pressure-vessel seal; and wherein at the chamber pressure of atmospheric pressure or less, the second pressure-vessel keys are removable from the second key ring, whereby the second end cap is consequently removable.

In embodiments employing pressure-vessel keys on both ends of the pressure vessel, preferably, the second pressure-vessel keys are removable without tooling. Preferably, the second end cap is removable without tooling. In some embodiments, the second interior seal plate is also removable without tooling.

In embodiments employing pressure-vessel keys on both ends of the pressure vessel, the number of second pressure-vessel keys may be at least 2, 3, 4, 5, 6, 7, 8, 9, 10, 11, 12, 13, 14, 15, 16, 17, 18, 19, 20, or more. In some embodiments, the number of second pressure-vessel keys is at least 4, at least 8, or at least 12.

In some embodiments employing pressure-vessel keys on both ends of the pressure vessel, at a chamber pressure of atmospheric pressure or less, the clearance between the second pressure-vessel keys and (a) the second end cap and/or (b) the second key ring is at least 0.015 inch.

In some embodiments employing pressure-vessel keys on both ends of the pressure vessel, the pressure vessel comprises a second seal-plate piston seal disposed on the outside diameter of the second interior seal plate. In certain embodiments, the pressure vessel further comprises a second end-cap piston seal disposed on the outside diameter of the second end cap.

In some embodiments employing pressure-vessel keys on both ends of the pressure vessel, the second end cap and the second interior seal plate form an integrated piece.

In embodiments employing pressure-vessel keys on both ends of the pressure vessel, there may be one or more second fittings disposed within the second interior seal plate. Typically this would be in addition to the first fittings disposed within the first interior seal plate, but optionally, the first fittings may be omitted and only the second fittings utilized.

In various embodiments, the chamber pressure is selected from greater than about 1 bar to about 1000 bar. In some embodiments, the chamber pressure is selected from about 5 bar to about 5000 bar, or from about 10 bar to about 2000 bar, for example.

In some embodiments, the pressure vessel is contained within a system configured for reaction and/or extraction of a biomass feedstock. For example, without limitation, the pressure vessel may be contained within a system configured for reaction and/or extraction of a biomass feedstock (or other feedstock) utilizing supercritical carbon dioxide.

Other variations of the invention provide a method of assembling and disassembling a pressure vessel, the method comprising:

(a) providing a pressure vessel as disclosed herein;

(b) adding materials to the chamber volume and closing the pressure vessel with the first end cap and, if applicable, the second end cap;

(c) placing the first pressure-vessel keys into the first key ring, and, if applicable, placing the second pressure-vessel keys into the second key ring;

(d) increasing the chamber pressure above atmospheric pressure, thereby actuating the first pressure-vessel seal and, if applicable, the second pressure-vessel seal, to form a closed and locked position of the pressure vessel;

(e) processing the materials within the chamber volume for a selected processing time, processing temperature within the chamber, and processing pressure within the chamber;

(f) decreasing the chamber pressure back to atmospheric pressure, thereby releasing the first pressure-vessel seal and, if applicable, the second pressure-vessel seal, to form a closed and unlocked position of the pressure vessel;

(g) removing the first pressure-vessel keys from the first key ring, and, if applicable, removing the second pressure-vessel keys from the second key ring;

(h) opening the pressure vessel to recovered processed materials; and (i) optionally, repeating steps (b) and (h) a plurality of times.

Preferably, the method is toolless.

In some methods, steps (b), (c), (g), and (h) are collectively characterized by an assembly-disassembly cycle time that is less than 50% of the overall cycle time of steps (b) to (h). In some embodiments, the assembly-disassembly cycle time is less than 20%, less than 10%, or less than 5%, of the overall cycle time of steps (b) to (h).

In some methods, the chamber pressure in step (d) that actuates and forms the closed and locked position of the pressure vessel, is less than the processing pressure within the chamber in step (e).

The processing pressure within the chamber in step (e) may be selected from greater than about 1 bar to about 1000 bar, from about 5 bar to about 5000 bar, or from about 10 bar to about 2000 bar, for example.

The processing temperature within the chamber in step (e) may be selected from about −50° C. to about 100° C., from about 0° C. to about 150° C., or from about 50° C. to about 200° C., for example.

The processing time in step (e) may be selected from about 1 minute to about 24 hours, or from about 10 minutes to about 4 hours, for example.

In some embodiments of the invention, the method is utilized for reaction and/or extraction of a biomass feedstock, or another feedstock, with supercritical carbon dioxide.

DETAILED DESCRIPTION OF EMBODIMENTS OF THE INVENTION

Figure 1:
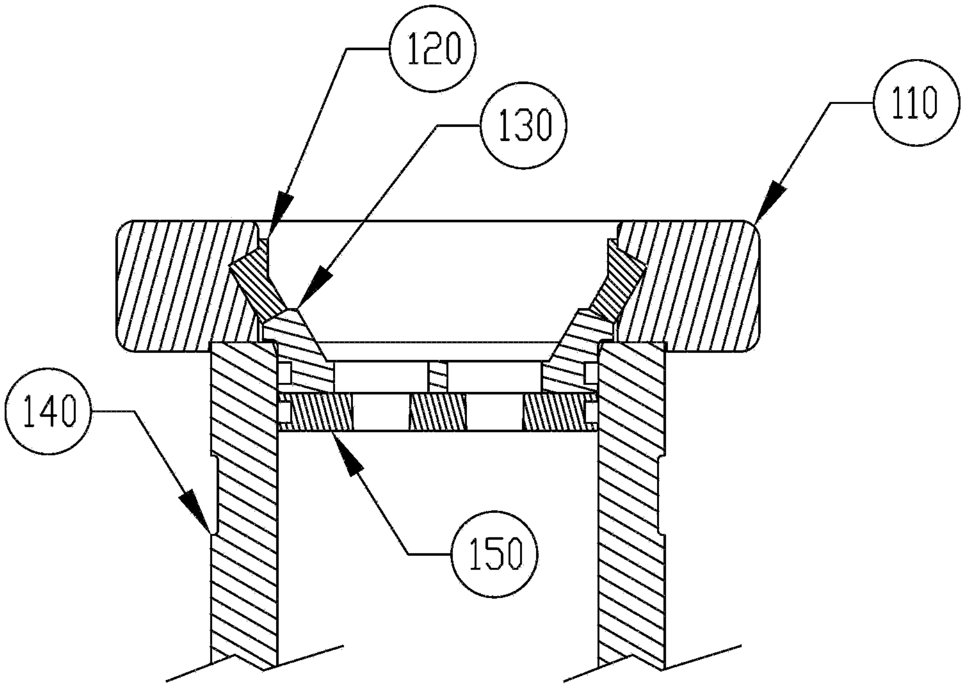
FIG. 1 is a side-view drawing depicting a pressure vessel in a locked, closed position, with a key ring 110, a plurality of keys 120, an end cap 130, a collection tube 140, and an interior seal plate 150, in some embodiments.

The systems, structures, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present invention is predicated on a solution that eliminates the need for tools to assemble, disassemble, or clean a pressure vessel. In some variations, the invention utilizes multiple high-strength keys that lock circular end caps in place at the end(s) of a cylindrical collection tube.

In this specification, a "key" is a removable vessel-locking member that is designed to fit within a region at or near the entrance of a pressure vessel, at or near the exit of a pressure vessel, or both of these. The tolerances are configured such that when no pressure is present within the pressure vessel, the keys are removable by hand—thereby allowing the end cap(s) to be easily removed from the system. When the pressure vessel is under pressure, the pressure vessel automatically "locks" and is sealed from the environment. In particular, the keys, end cap, and seal plate all cooperate to passively seal the pressure vessel without the use of tools.

According to the principles taught herein, the speed and convenience of accessing material within the pressure vessel is dramatically increased. The absence of a requirement of tools for vessel assembly/disassembly reduces the number of support items necessary to operate and maintain the vessel. In some configurations, end caps can be removed from both ends of a pressure vessel to allow dual access, which can increase the efficiency of collection and cleaning processes. Generally, the invention enables a greatly reduced fraction of time spent on opening and closing a pressure vessel, relative to the overall cycle time of processing.

Some variations of the invention provide a pressure vessel comprising:

- a chamber configured for processing a material in a chamber volume under a chamber pressure selected from greater than atmospheric pressure (about 1 bar) to about 5000 bar;
- a first end cap disposed at one end of the pressure chamber;
- a first interior seal plate disposed between the first end cap and the chamber volume; and
- a plurality of first pressure-vessel keys disposed between (a) the first end cap and (b) a first key ring configured to hold the first pressure-vessel keys in place,
- wherein at a chamber pressure greater than atmospheric pressure, the first end cap exerts a force against the first pressure-vessel keys and the first key ring to automatically and reversibly actuate a first pressure-vessel seal; and wherein at a chamber pressure of atmospheric pressure or less, the first pressure-vessel keys are removable from the first key ring, whereby the first end cap is consequently removable.

Preferably, the first pressure-vessel keys are removable without tooling. Preferably, the first end cap is removable without tooling. In some embodiments, the first interior seal plate is also removable without tooling.

The number of first pressure-vessel keys may be at least, or exactly, 2, 3, 4, 5, 6, 7, 8, 9, 10, 11, 12, 13, 14, 15, 16, 17, 18, 19, 20, or more. In some embodiments, the number of first pressure-vessel keys is at least, or exactly, 4, 8, or 12.

Figure 4:
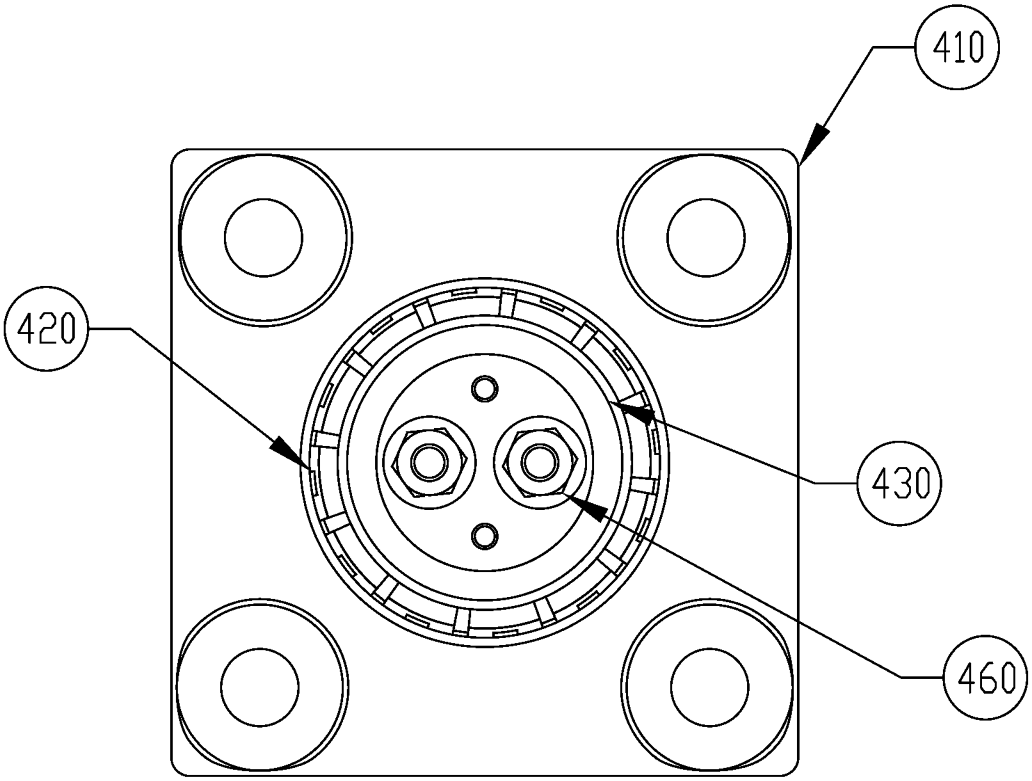
FIG. 4 is a top-view drawing depicting a pressure vessel in a locked, closed position, with a key ring 410, a plurality of keys 420, an end cap 430, and one or more fittings 460, in some embodiments.

The geometry (e.g., length, width, depth, and curvature) of each first pressure-vessel key will be dictated by the vessel opening geometry and diameter, the number of keys employed, and the intended vessel pressure, for example. In the illustration of FIG. 4, each of the 12 keys has slight curvature so that when all 12 keys are in place, a ring of keys is formed. There would be less curvature in a given key with more keys, and conversely, more curvature with fewer keys (e.g., 2 or 4 keys). Modeling may be employed by a skilled artisan to design the key geometry. Typically, for a given system, all the keys have essentially the same geometry. Optionally, keys with different circumferential span lengths (i.e., length measured along the curvature that is adapted to the vessel circumference) may be used, such as alternating short and long keys, for example.

The plurality of first pressure-vessel keys preferably forms a circle (e.g., see FIG. 4) when the pressure vessel has a circular opening, which is typical when high-pressure operation is desired. There may be small gaps between adjacent keys. For example, the average gap between adjacent first pressure-vessel keys may be 0.01, 0.02, 0.03, 0.04, 0.05, 0.1, 0.2, 0.3, 0.4, or 0.5 inch.

In some embodiments, at a chamber pressure of atmospheric pressure or less, the clearance between the first pressure-vessel keys and (a) the first end cap and/or (b) the first key ring is at least 0.015 inch. Other clearances may be employed. In various embodiments, at a chamber pressure of atmospheric pressure or less, the clearance between the first pressure-vessel keys and the first end cap is about, at least about, or at most about 0.005, 0.010, 0.015, 0.020, 0.025, or 0.030 inch. In various embodiments, at a chamber pressure of atmospheric pressure or less, the clearance between the first pressure-vessel keys and the first key ring is about, at least about, or at most about 0.005, 0.010, 0.015, 0.020, 0.025, or 0.030 inch. In some embodiments, at a chamber pressure of atmospheric pressure or less, the total clearance (calculated as clearance between the first pressure-vessel keys and the first end cap, plus clearance between the first pressure-vessel keys and the first key ring) is about, at least about, or at most about 0.005, 0.010, 0.015, 0.020, 0.025, 0.030, 0.035, 0.040, 0.045, or 0.050 inch.

Typically, the pressure vessel is configured such that local atmospheric pressure is a first threshold pressure above which the first end cap exerts a force against the first pressure-vessel keys as well as the first key ring, thereby automatically and reversibly actuating a first pressure-vessel seal. However, conceptually, the first threshold pressure may be a pressure that is different than atmospheric pressure, if for some reason that is desirable. For example, the first threshold pressure may be about 0.5, 0.6, 0.7, 0.8, 0.9, 1.0, 1.1, 1.2, 1.3, 1.4, or 1.5 bar.

Atmospheric pressure is usually 1 bar, but it depends on altitude. For example, the atmospheric pressure in Denver, Colorado is about 0.8 bar. The atmospheric pressure in an underground geological formation may be about 1.1 bar to about 2 bar, for example.

Piston seals may be utilized on the outside diameter of the interior seal plate, interfacing with the collection chamber, to provide the primary method of sealing. A second seal may be utilized on the outside diameter of the end cap for redundancy and safety. In preferred embodiments, the pressure vessel comprises a first seal-plate piston seal disposed on the outside diameter of the first interior seal plate. In some embodiments, the pressure vessel further comprises a first end-cap piston seal disposed on the outside diameter of the first end cap.

Figure 3:
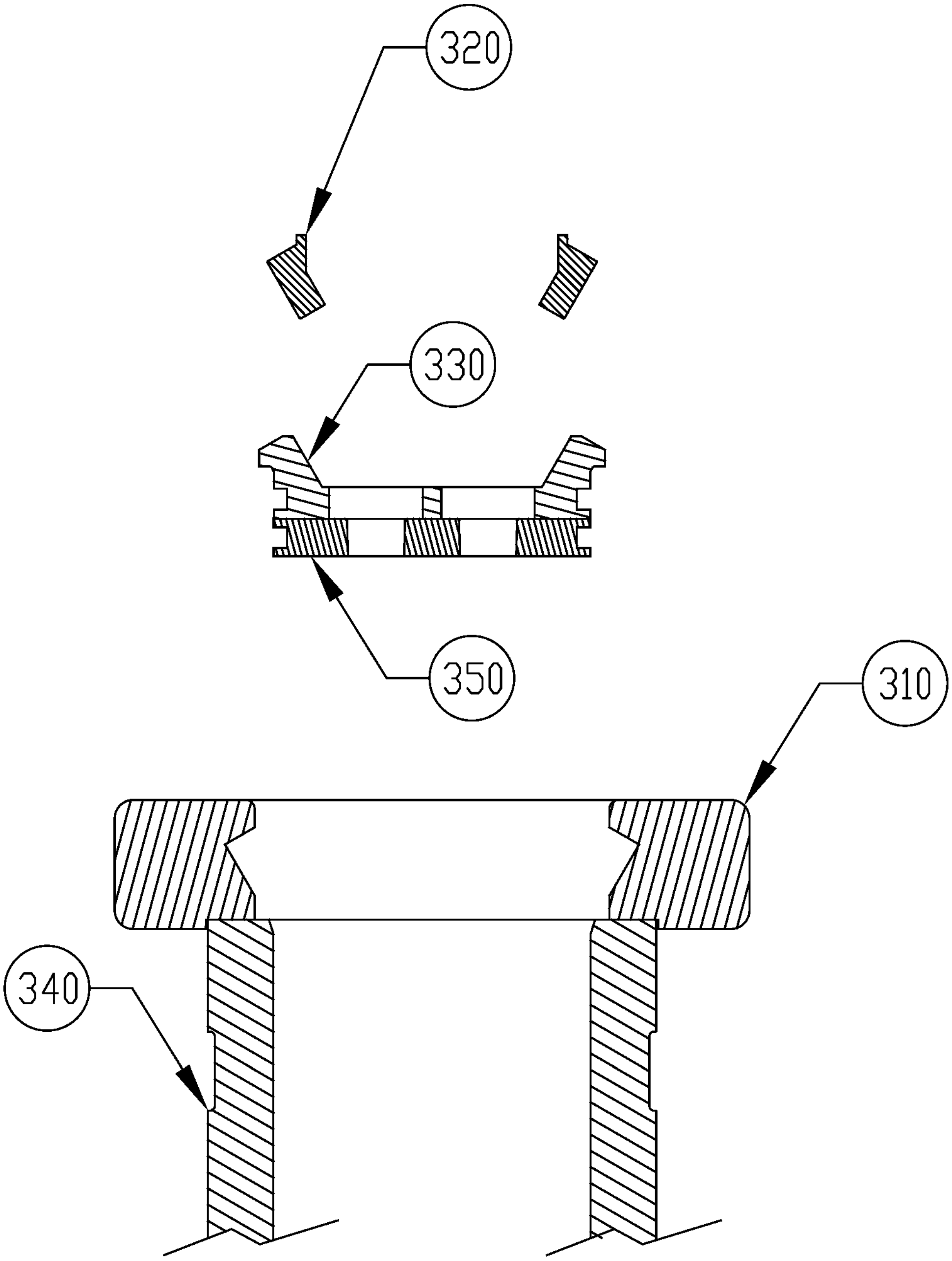
FIG. 3 is a side-view drawing depicting a pressure vessel in an unlocked, open position, with a key ring 310, a plurality of keys 320, an end cap 330, a collection tube 340, and an interior seal plate 350, in some embodiments.

In some embodiments, the first end cap and the first interior seal plate form an integrated piece (e.g., see FIG. 3). That is, the first end cap and first interior seal plate may be fabricated to be one continuous piece, from the same material or using different materials that are machined or welded together, for example. Alternatively, the first end cap and the first interior seal plate may be distinct components that are easily separable from each other.

The pressure vessel may further comprise one or more first fittings disposed within the first interior seal plate. Fittings may be used for introducing a fluid into the process chamber, for withdrawing a fluid from the process chamber, for measuring temperature or pH, or for inserting an agitator shaft into the process chamber, for example.

In some variations of the invention, the pressure vessel further comprises:

a second end cap disposed at the opposite end of the pressure chamber;

a second interior seal plate disposed between the second end cap and the chamber volume; and a plurality of second pressure-vessel keys disposed between (a) the second end cap and (b) a second key ring configured to hold the second pressure-vessel keys in place, wherein at a chamber pressure greater than atmospheric pressure, the second end cap exerts a force against the second pressure-vessel keys and the second key ring to automatically and reversibly actuate a second pressure-vessel seal; and wherein at a chamber pressure of atmospheric pressure or less, the second pressure-vessel keys are removable from the second key ring, whereby the second end cap is consequently removable.

Figure 8:
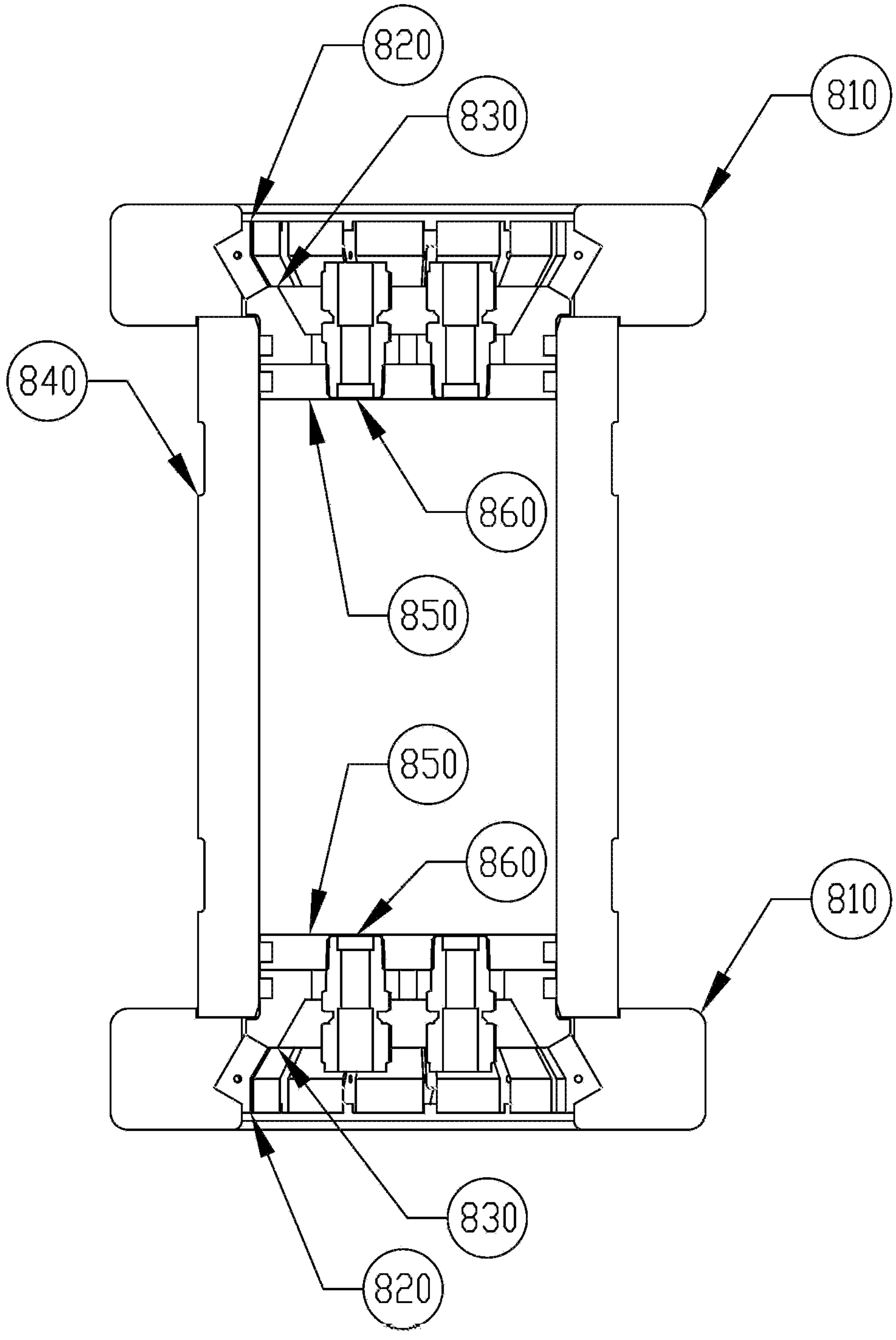
FIG. 8 is a side-view drawing depicting an exemplary pressure vessel in a locked, closed position, with keys at both ends of the pressure vessel. At both the top and bottom of the vessel, there is a key ring 810, a plurality of keys 820, an end cap 830, a collection tube 840, an interior seal plate 850, and one or more fittings 860.

In embodiments (such as depicted in FIG. 8) employing pressure-vessel keys on both ends of the pressure vessel, the second pressure-vessel keys are preferably removable without tooling. Also preferably, the second end cap is removable without tooling. In some embodiments, additionally the second interior seal plate is removable without tooling.

In embodiments employing pressure-vessel keys on both ends of the pressure vessel, the number of second pressure-vessel keys may be at least, or exactly, 2, 3, 4, 5, 6, 7, 8, 9, 10, 11, 12, 13, 14, 15, 16, 17, 18, 19, 20, or more. In some embodiments, the number of second pressure-vessel keys is at least, or exactly, 4, 8, or 12.

The drawing of FIG. 4, which is described in more detail below, is also applicable to the opposite end of the pressure vessel, where a second end cap, a second interior seal plate, and a plurality of second pressure-vessel keys may be present. "Opposite" refers to the end distally opposed to the first end of the pressure vessel, where there is a first end cap, a first interior seal plate, and a plurality of first pressure-vessel keys.

The geometry (e.g., length, width, depth, and curvature) of each second pressure-vessel key will be dictated by the vessel diameter, the number of second keys employed, and the intended vessel pressure, for example. In the illustration of FIG. 4, each of the 12 keys has slight curvature so that when all 12 keys are in place, a ring of keys is formed. There would be less curvature in a given key with more keys, and conversely, more curvature with fewer keys (e.g. 2 or 4 keys). Modeling may be employed by a skilled artisan to design the geometry for the second keys. Typically, the second keys all heave essentially the same geometry as each other. Optionally, keys with different circumferential span lengths (i.e. length measured along the curvature that is adapted to the vessel circumference) may be used, such as alternating short and long keys, for example. Also, the geometry of second pressure-vessel keys may be the same as, or different than, the geometry of the first pressure-vessel keys.

In some embodiments employing pressure-vessel keys on both ends of the pressure vessel, at a chamber pressure of atmospheric pressure or less, the clearance between the second pressure-vessel keys and (a) the second end cap and/or (b) the second key ring is at least 0.015 inch. Other clearances may be employed. In various embodiments, at a chamber pressure of atmospheric pressure or less, the clearance between the second pressure-vessel keys and the second end cap is about, at least about, or at most about 0.005, 0.010, 0.015, 0.020, 0.025, or 0.030 inch. In various embodiments, at a chamber pressure of atmospheric pressure or less, the clearance between the second pressure-vessel keys and the second key ring is about, at least about, or at most about 0.005, 0.010, 0.015, 0.020, 0.025, or 0.030 inch. In some embodiments, at a chamber pressure of atmospheric pressure or less, the total clearance (calculated as clearance between the second pressure-vessel keys and the second end cap, plus clearance between the second pressure-vessel keys and the second key ring) is about, at least about, or at most about 0.005, 0.010, 0.015, 0.020, 0.025, 0.030, 0.035, 0.040, 0.045, or 0.050 inch. The clearances employed at both ends of the pressure vessel are preferably the same, but not necessarily.

Typically, in embodiments employing pressure-vessel keys on both ends of the pressure vessel, the pressure vessel is configured such that local atmospheric pressure is a second threshold pressure above which the second end cap exerts a force against the second pressure-vessel keys as well as the second key ring, thereby automatically and reversibly actuating a second pressure-vessel seal. The second threshold pressure may be a pressure that is different than atmospheric pressure, such as about 0.5, 0.6, 0.7, 0.8, 0.9, 1.0, 1.1, 1.2, 1.3, 1.4, or 1.5 bar.

The second threshold pressure is preferably the same as the first threshold pressure. In certain embodiments, the second threshold pressure is slightly different than the first threshold pressure, so that one end of the pressure vessel may be opened up while the opposite end remains closed until a later time.

In some embodiments employing pressure-vessel keys on both ends of the pressure vessel, the pressure vessel comprises a second seal-plate piston seal disposed on the outside diameter of the second interior seal plate. In certain embodiments, the pressure vessel further comprises a second end-cap piston seal disposed on the outside diameter of the second end cap.

In some embodiments employing pressure-vessel keys on both ends of the pressure vessel, the second end cap and the second interior seal plate may be formed as an integrated piece. That is, the second end cap and second interior seal plate may be fabricated to be one continuous piece, from the same material or using different materials that are machined or welded together, for example. Alternatively, the second end cap and the second interior seal plate may distinct components that are easily separable from each other.

In embodiments employing pressure-vessel keys on both ends of the pressure vessel, there may be one or more second fittings disposed within the second interior seal plate. Typically this would be in addition to the first fittings disposed within the first interior seal plate; optionally, the first fittings may be omitted and only the second fittings utilized. When second fittings are included, they may be used for introducing a fluid into the process chamber, for withdrawing a fluid from the process chamber, or for measuring temperature or pH, for example.

The diameter of the pressure vessel may vary widely, such as from about 10 centimeters to about 10 meters. In various embodiments, the diameter of the pressure vessel is about 0.05, 0.1, 0.2, 0.3, 0.4, 0.5, 1, 1.5, 2, 3, 4, 5, 6, 7, 8, 9, or 10 meters. Typically, the pressure vessel is circular, but if it is another geometry such as oval or square, then the numbers in this paragraph are equivalent diameters of the pressure vessel.

The chamber pressure may selected from greater than about 1 bar to about 1000 bar, for example. In some embodiments, the chamber pressure is selected from about 5 bar to about 5000 bar, or from about 10 bar to about 2000 bar, for example. In various embodiments, the chamber pressure is selected from about, at least about, or at most about 1, 2, 3, 4, 5, 10, 20, 30, 40, 50, 100, 200, 300, 400, 500, 600, 700, 800, 900, 1000, 1500, 2000, 2500, 3000, 3500, 4000, 4500, or 5000 bar, including all intervening ranges.

In some embodiments, the pressure vessel is contained within a system configured for reaction and/or extraction of a biomass feedstock. For example, without limitation, the pressure vessel may be contained within a system configured for reaction and/or extraction of a biomass feedstock (or other feedstock) utilizing supercritical carbon dioxide or another solvent.

Various embodiments of the pressure vessel will now be further described with reference to the accompanying drawings (FIGS. 1 to 8), without intending to limit the scope of the invention in any way. The drawings are not necessarily drawn to scale.

FIG. 1 is a side-view drawing depicting a pressure vessel with a key ring 110, a plurality of keys 120, an end cap 130, a collection tube 140, and an interior seal plate 150. The number of individual keys may vary; the 2D view of FIG. 1 explicitly shows two of the keys 120. The pressure vessel of FIG. 1 is shown in a locked, closed position. The collection tube 140 forms walls that enclose a pressure chamber in which material may be processed. During operation at a chamber pressure above a key pressure (e.g., atmospheric pressure), the end cap 130 exerts a force against the keys 120 to reduce the clearance between the end cap 130 and each key 120. This force locks the pressure chamber and seals it so that no fluid is allowed to escape or enter the pressure chamber.

Figure 2:
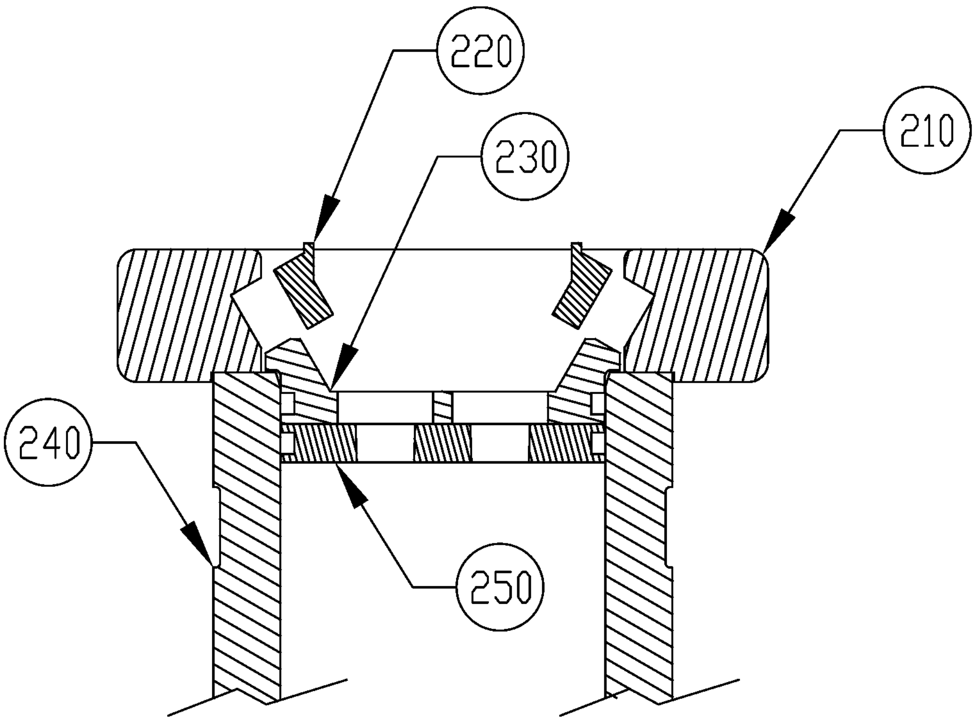
FIG. 2 is a side-view drawing depicting a pressure vessel an unlocked, closed position, with a key ring 210, a plurality of keys 220, an end cap 230, a collection tube 240, and an interior seal plate 250, in some embodiments.

FIG. 2 is a side-view drawing depicting a pressure vessel with a key ring 210, a plurality of keys 220, an end cap 230, a collection tube 240, and an interior seal plate 250. The pressure vessel of FIG. 2 is shown in an unlocked, closed position. The chamber pressure is at or below a key pressure, causing a reduced force exerted by the end cap 230 against the keys 220 to increase the clearance between the end cap 230 and each key 220. This force reduction unlocks the pressure chamber and allows each key 220 to easily be removed by hand. "By hand" means manually by a human operator without tools or a machine.

FIG. 3 is a side-view drawing depicting a pressure vessel with a key ring 310, a plurality of keys 320, an end cap 330, a collection tube 340, and an interior seal plate 350. The pressure vessel of FIG. 3 is shown in an unlocked, open position. The end cap 330 has been removed from the rest of the pressure vessel, allowing material to be introduced to and/or recovered from the pressure chamber. The keys 320 may be removed and installed by hand. Also, the end cap 330 and the interior seal plate 350 may be removed and installed by hand.

Alternatively, the end cap 330 may be attached to a rod or other movable member to raise and lower the end cap 330 (and, when integrated, the interior seal plate 350) by hydraulic, pneumatic, or electrical means. In these alternative embodiments, the end cap 330 and interior seal plate 350 need to be out of the way when contents are being loaded into, or removed from, the collection tube 340. When the pressure vessel is relatively small, it is usually most convenient to remove, and install, the keys 320, the end cap 330, and interior seal plate 350 all by hand (i.e., solely by a human operator). If the pressure vessel is a very large industrial vessel, then use of a movable member such as a cantilevered hydraulically driven lift may be desirable for moving the end cap 330 and interior seal plate 350. Even for a large pressure vessel, the keys are usually small enough to be removable and replaceable by hand.

FIG. 4 is a top-view drawing depicting a pressure vessel with a key ring 410, a plurality of keys 420, an end cap 430, and one or more fittings 460. A fitting 460 enables an inlet/outlet port for fluid (e.g., supercritical $CO_2$) to be introduced to the pressure chamber or purged from the pressure chamber. Other uses for a fitting 460 include a mixing rod, a temperature sensor, or a pressure-relief valve. The number of individual keys 420 is 12. The collection tube and interior seal plate are hidden from view. The pressure vessel of FIG. 4 is shown in a locked, closed position.

Figure 5:
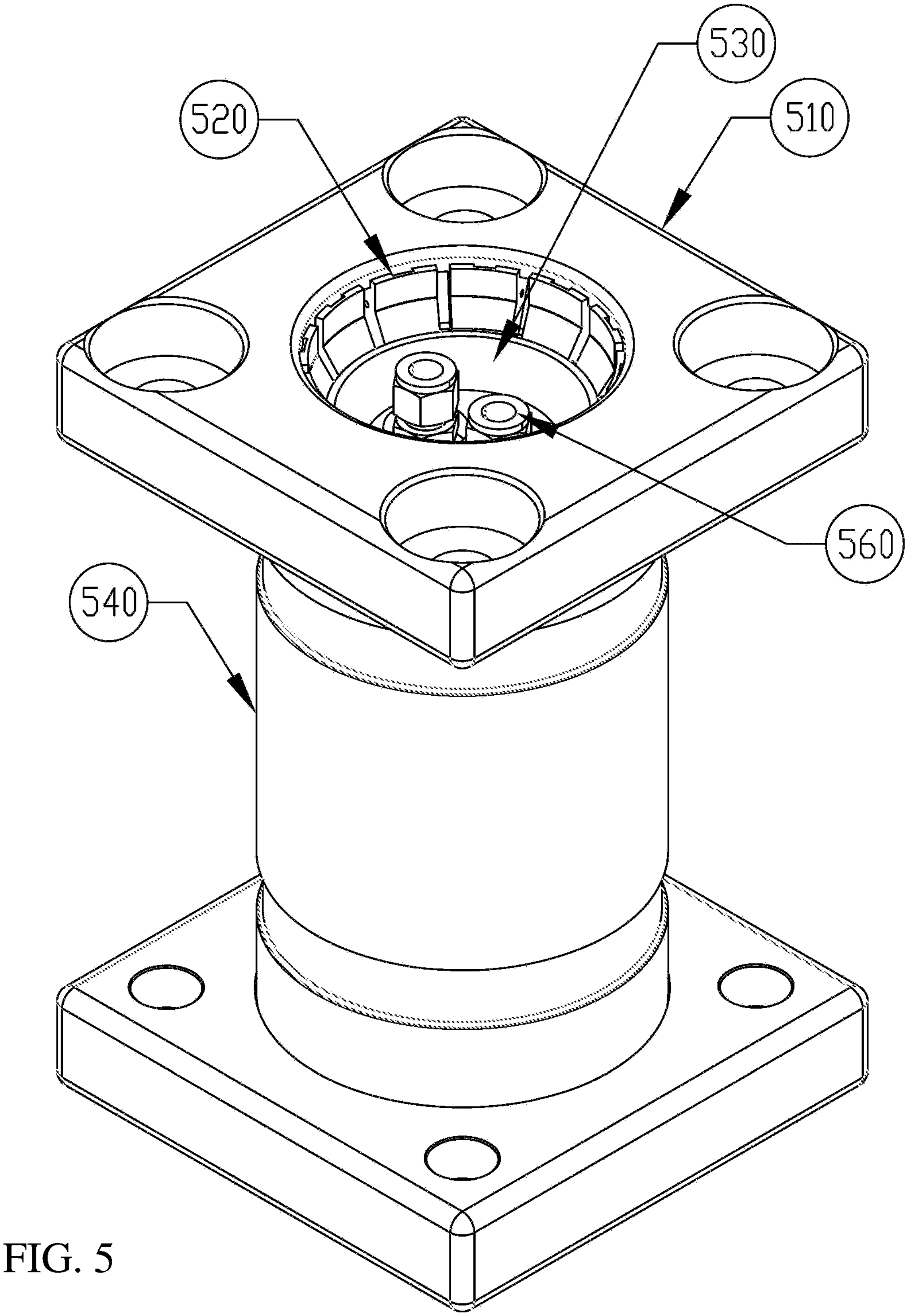
FIG. 5 is an isometric-view drawing depicting a pressure vessel in a locked, closed position, with a key ring 510, a plurality of keys 520, an end cap 530, a collection tube 540, and one or more fittings 560, in some embodiments.

FIG. 5 is an isometric-view drawing depicting a pressure vessel with a key ring 510, a plurality of keys 520, an end cap 530, a collection tube 540, and one or more fittings 560. The interior seal plate is hidden from view. The pressure vessel of FIG. 5 is shown in a locked, closed position.

Figure 6:
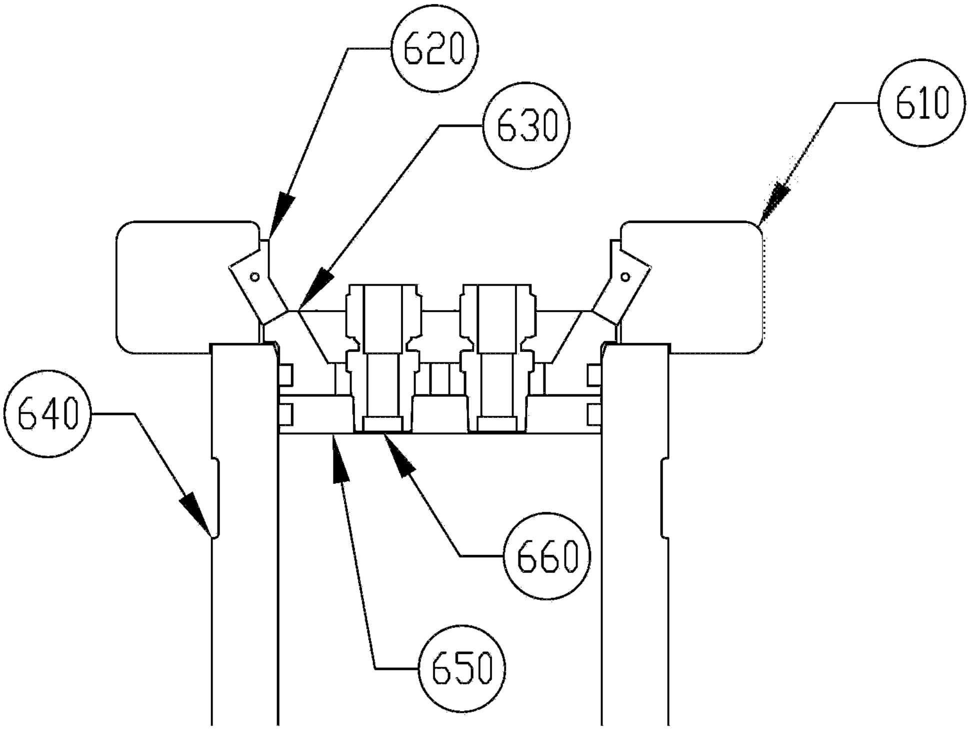
FIG. 6 is a side-view drawing depicting a pressure vessel in a locked, closed position, with a key ring 610, a plurality of keys 620, an end cap 630, a collection tube 640, an interior seal plate 650, and one or more fittings 660, in some embodiments.

FIG. 6 is a side-view drawing depicting a pressure vessel with a key ring 610, a plurality of keys 620, an end cap 630, a collection tube 640, an interior seal plate 650, and one or more fittings 660. The number of individual keys may vary (the 2D view of FIG. 6 explicitly shows two of the keys 620). The pressure vessel of FIG. 6 is shown in a locked, closed position. The collection tube 640 forms walls that enclose a pressure chamber in which material may be processed. During operation at a chamber pressure above a key pressure (e.g., atmospheric pressure), the end cap 630 exerts a force against the keys 620 to reduce the clearance between the end cap 630 and each key 620. This locks the pressure chamber and seals it so that no fluid is allowed to escape or enter the pressure chamber, except when a valve is opened to allow fluid flow through a fitting 660.

Figure 7:
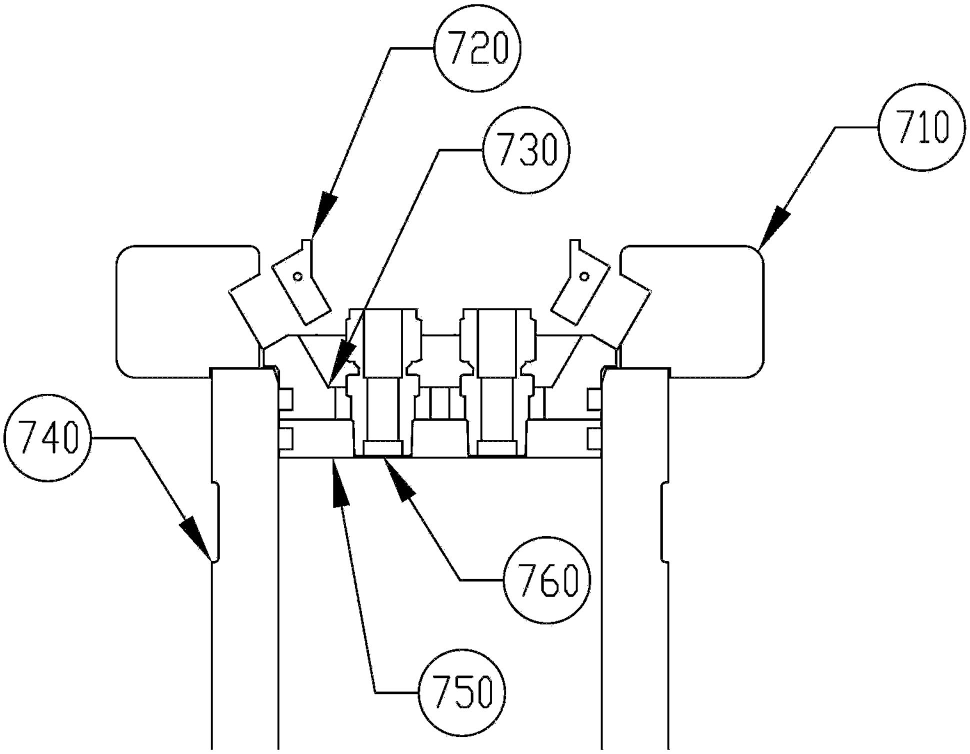
FIG. 7 is a side-view drawing depicting a pressure vessel in an unlocked, closed position, with a key ring 710, a plurality of keys 720, an end cap 730, a collection tube 740, an interior seal plate 750, and one or more fittings 760, in some embodiments.

FIG. 7 is a side-view drawing depicting a pressure vessel with a key ring 710, a plurality of keys 720, an end cap 730, a collection tube 740, an interior seal plate 750, and one or more fittings 760. The pressure vessel of FIG. 7 is shown in an unlocked, closed position. The chamber pressure is at or below a key pressure, causing a reduced force exerted by the end cap 730 against the keys 720 to increase the clearance between the end cap 730 and each key 720. This unlocks the pressure chamber by allowing each key 720 to easily be removed by hand.

FIG. 8 is a side-view drawing depicting a pressure vessel configured with keys at both ends of the pressure vessel. At the top of the pressure vessel, there is a key ring 810, a plurality of keys 820, an end cap 830, a collection tube 840, an interior seal plate 850, and one or more fittings 860. At the bottom of the pressure vessel, there is also a key ring 810, a plurality of keys 820, an end cap 830, a collection tube 840, an interior seal plate 850, and one or more fittings 860; the structural elements at the bottom may be the same or different than the structural elements at the top of the pressure vessel. The pressure vessel of FIG. 8 is shown in a locked, closed position. The collection tube 840 forms walls that enclose a pressure chamber in which material may be processed. During operation at a chamber pressure above a key pressure (e.g., atmospheric pressure), each end cap 830 exerts a force against the keys 820 to reduce the clearance between the end cap 830 and each key 820, at each end of the pressure vessel. This locks the pressure chamber and seals it so that no fluid is allowed to escape or enter the pressure chamber.

Not shown in FIGS. 1-8 is an optional mechanism that can cause the vessel top plate to be raised to a loading position or lowered to a discharge position. Such equipment is known in the art. For example, such a mechanism may be a cantilevered hydraulically driven lift.

Materials of construction for the pressure vessel may vary widely, depending on the intended process conditions. The invention is not necessarily limited to any particular materials of construction.

Generally, different materials may be utilized for different components of the pressure vessel. For example, internal surfaces (e.g., interior seal plates) that contact process contents may be 304 or 316 stainless steel. In some embodiments, internal surfaces are coated with a ceramic (e.g., silicon carbide) or a polymer (e.g., polytetrafluoroethylene). High-strength tool steel alloys, such as A2 steel, 1018 steel, 4130 steel, or 1040 steel may be utilized in regions that require or benefit from higher strengths compared to stainless steel. For example, end caps, keys, key rings, and threaded rods may utilize tool steel alloys. High-pressure stainless-steel fittings may be utilized for transport of fluids.

The pressure-vessel keys may be fabricated from metals, metal alloys, high-strength polymers, metal-matrix composites, or carbon composites, for example. In certain embodiments, the pressure-vessel keys are fabricated from a different material than any other material in physical contact with the keys, which typically are the key ring and end cap. For example, titanium keys could be employed along with a tool-steel key ring and a tool-steel end cap.

The key rings may be fabricated from metals, metal alloys, high-strength polymers, metal-matrix composites, or carbon composites, for example, which may be the same material as the keys, or a different material.

The end caps may be fabricated from metals, metal alloys, or metal-matrix composites, for example, which may be the same material as the keys, or a different material.

The collection tube may be fabricated from metals, metal alloys, or metal-matrix composites, for example.

The interior seal plates may be fabricated from metals, metal alloys, or metal-matrix composites, for example, which may be the same material as the collection tube, or a different material.

The fittings may be fabricated from metals or metal alloys, for example, which may be the same material as the collection tube, or a different material.

Various embodiments employ carbon steel, carbon manganese steel, low alloy steels, high alloy steels, stainless steels, titanium, titanium alloys, nickel alloys (e.g., nickel-molybdenum alloys), aluminum, and combinations thereof, for one or more components.

Vessel pressure (under operation) is an important parameter that will impact the selection of materials. For a low-pressure vessel, keys, key rings, and/or end caps may be fabricated from low-cost aluminum, for example.

The selection of materials preferably is made in consideration of the minimum strength requirement imposed by the actuation of the keys when the vessel is under pressure. A minimum compressive strength may be specified for the keys, the key ring, and/or the end cap. For example, the minimum compressive strength of the keys may be about 500, 600, 700, 800, 900, 1000, 1100, 1200, 1300, 1400, 1500, 1600, 1700, 1800, 1900, or 2000 MPa. Independently, the minimum compressive strength of the key ring may be about 500, 600, 700, 800, 900, 1000, 1100, 1200, 1300, 1400, 1500, 1600, 1700, 1800, 1900, or 2000 MPa. Independently, the minimum compressive strength of the end caps may be about 500, 600, 700, 800, 900, 1000, 1100, 1200, 1300, 1400, 1500, 1600, 1700, 1800, 1900, or 2000 MPa.

In addition to compressive strength, other mechanical properties may be considered for the keys, key rings, end caps, and/or other components-such as (but not limited to) hardness, malleability, brittleness, toughness, stiffness, elasticity, ductility, shear strength, and fatigue. Because the keys and key rings are not exposed to the process fluid, chemical reactivity typically does not need to be considered. Thermal loads and temperature distributions across components, and the influence of temperature on mechanical properties, may be considered, using for example a three-dimensional model of heat transport.

A functional prototype may be fabricated from a material different than, and typically lower cost than, the intended final material of a part. As one example, 3D-printed polymer keys, key rings, and end caps may be fabricated to assess the geometric compatibility of the different parts. Parts (whether prototypes or final parts) may be produced by additive manufacturing or subtractive manufacturing. Modeling software may be employed using methodologies known in the mechanical arts. Three-dimensional (3D) modeling, including finite element analysis, may be utilized. Known principles of mechanical engineering may be applied, including factors of safety. For example, the pressure vessel may be designed with a factor of safety of approximately 2 under the maximum operational pressure.

Other variations of the invention provide a method of assembling and disassembling a pressure vessel, the method comprising:

(a) providing a pressure vessel, such as a pressure vessel disclosed above;

(b) adding materials to the chamber volume and closing the pressure vessel with the first end cap and, if applicable, the second end cap;

(c) placing the first pressure-vessel keys into the first key ring, and, if applicable, placing the second pressure-vessel keys into the second key ring;

(d) increasing the chamber pressure above atmospheric pressure, thereby actuating the first pressure-vessel seal and, if applicable, the second pressure-vessel seal, to form a closed and locked position of the pressure vessel;

(e) processing the materials within the chamber volume for a selected processing time, processing temperature within the chamber, and processing pressure within the chamber;

(f) decreasing the chamber pressure back to atmospheric pressure, thereby releasing the first pressure-vessel seal and, if applicable, the second pressure-vessel seal, to form a closed and unlocked position of the pressure vessel;

(g) removing the first pressure-vessel keys from the first key ring, and, if applicable, removing the second pressure-vessel keys from the second key ring;

(h) opening the pressure vessel to recovered processed materials; and (i) optionally, repeating steps (b) and (h) a plurality of times.

Preferably, the method is toolless. By "toolless" it is meant that the method does not require tools to open or close the pressure vessel. It will be understood that an operator of the method may choose to use a tool, such as a pliers, to assist in the removal of a key—without departing from the spirit and scope of the invention. Stated another way, toolless removal of a key means that the key is capable of being removed by hand, whether or not the key is actually removed by hand, for whatever reason, by any particular operator.

The rapid rate at which the pressure chamber can conveniently be opened and closed substantially increases productivity and reduce costs. The removal of keys from the key ring, and later replacement of keys back into the key ring, is a relatively quick process that depends on number of keys (e.g., removing 12 keys will take slightly longer than removing 4 keys, if performed by a single person).

In some methods, steps (b), (c), (g), and (h) are collectively characterized by an assembly-disassembly cycle time that is less than 50% of the overall cycle time of steps (b) to (h). In some embodiments, the assembly-disassembly cycle time is less than 20%, less than 10%, or less than 5%, of the overall cycle time of steps (b) to (h).

For example, if the overall cycle time of steps (b) to (h) is 100 minutes, then the assembly-disassembly cycle time may be less than 50 minutes, less than 20 minutes, less than 10 minutes, or less than 5 minutes, which represent less than 50%, 20%, 10%, and 5%, respectively, of the overall cycle time. In various embodiments, the assembly-disassembly cycle time is about, or at most about, 15, 14, 13, 12, 11, 10, 9, 8, 7, 6, 5, 4, 3, or 2 minutes, or even less.

In conventional processes, the processing time may be a relatively small fraction (e.g., 10-20%) of the total cycle time since so much time is conventionally necessary to bolt and unbolt the plates from the rest of the vessel. By contrast, in the present invention, the processing time (which is dictated by the desired reaction or extraction) may be a large fraction of the overall cycle time. In various embodiments, the processing time is about, or at least about, 50%, 60%, 70%, 80%, 85%, 90%, 95%, 96%, 97%, 98%, or 99% of the overall cycle time of steps (b) to (h). A high fraction of overall cycle time for the processing time is very resource-efficient.

In some methods, the chamber pressure in step (d) that actuates and forms the closed and locked position of the pressure vessel, is less than the processing pressure within the chamber in step (e). Stated another way, the pressure vessel needs to seal itself so that at the intended processing pressure, there are no leaks. As the pressure is increased from atmospheric pressure to the operating pressure, the pressure vessel becomes fully locked and sealed at some pressure, which usually (but not necessarily) is lower than the operating pressure, as a safety factor. As an example, if the operating pressure is 100 bar and the initial pressure is 1 bar, the actual sealing may occur at a pressure of just over 1 bar, or may not occur until closer to 100 bar. Preferably, sealing takes place at a pressure closer to the initial pressure than the operating pressure.

Before loading the pressure vessel, the vessel may be positioned at an angle above the horizontal of approximately 30-60° and can even be placed at 90° (on end), if desired. When the pressure vessel is open, a loading device, such as a conveyor, may be used to introduce a quantity of feedstock into the collection tube, or to assist in removal of processed material out of the collection tube. The collection tube may be rotated during loading, to assist in uniform loading of material.

The processing pressure within the chamber in step (e) may be selected from greater than 1 bar to about 1000 bar, from about 5 bar to about 5000 bar, or from about 10 bar to about 2000 bar, for example. In various embodiments, the processing pressure is about, at least about, or at most about 1, 2, 3, 4, 5, 10, 15, 20, 25, 50, 75, 100, 150, 200, 250, 300, 400, 500, 600, 700, 800, 900, 1000, 1500, 2000, 2500, 3000, 3500, 4000, 4500, or 5000 bar, including all intervening ranges.

Following the desired reaction or extraction, the vessel pressure needs to be reduced. This may be accomplished by withdrawing (venting) pressurized gas from the chamber, pulling some vacuum, reducing chamber temperature such that pressure decreases thermodynamically, or a combination thereof. The time to reduce the pressure back down to atmospheric may vary, depending how it is accomplished, but may be very rapid if a vent or vacuum is used. Once atmospheric pressure is reached, the keys are easily removable from the key ring and the pressure vessel may be opened for unloading, optionally cleaning, and reloading for the next cycle.

The processing temperature within the chamber in step (e) may be selected from about −50° C. to about 100° C., from about 0° C. to about 150° C., or from about 50° C. to about 200° C., for example. In various embodiments, the processing temperature is about, at least about, or at most about −50° C., −25° C., −10° C., 0° C., 10° C., 20° C., 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including all intervening ranges. The processing temperature may be achieved or controlled using various known means, such as a steam jacket, hot oil, coolants, electrical coils, heating tape, an oven, induction heating elements, etc. An insulation jacket may be used to reduce heat losses. In some embodiments, direct steam heating is performed by steam injected directly into the pressure chamber to heat up the material being processed. This type of heating can be beneficial when water/steam is a desired reactant or extractant.

The processing time in step (e) may be selected from about 1 minute to about 24 hours, or from about 10 minutes to about 4 hours, for example. In various embodiments, the processing time is about, at least about, or at most about 1, 2, 3, 4, 5, 10, 15, 20, 30, 40, 50, 60, 90, 120, 150, 180, or 240 minutes, including all intervening ranges.

In addition to pressure, temperature, and time, other process conditions may be controlled or monitored, such as (but not limited to) humidity, pH, solvent phase (e.g., supercritical phase), mixing effectiveness, electrochemical potential, etc. For example, humidity may be monitored and optionally controlled to be from about 0 (dry) to about 100% or more, i.e., the vessel contents may be sub saturated, saturated, or supersaturated in water.

In some embodiments of the invention, the method is utilized for reaction and/or extraction of a biomass feedstock, or another feedstock, with supercritical carbon dioxide. Other solvents, reactants, catalysts may be used in the reaction and/or extraction in the pressure vessel.

Agitation may be employed to agitate the contents of the process chamber to improve the mass and heat transfer within the chamber. For example, a stir shaft and impeller may be configured in one of the fittings. In these or other embodiments, rotation, tumbling, shaking/vibration, sonication, or a combination thereof may be utilized. For example, to rotate the pressure vessel, one end of the vessel may be supported by a motor-driven rotation means that can include a belt, chain, gear-driven rotation means or other motor-driven apparatus that can impart a rotation to the vessel, such as about 1 to about 10 revolutions per minute. In these or other embodiments, a continuous withdrawal and reinjection of a gas or fluid is employed to aid in mixing.

The pressure vessel may be configured to operate vertically, horizontally, or at an angle. The pressure vessel may be configured such that it can be rotated about its axis of symmetry, for ease of loading or unloading.

The pressure vessel may be configured such that it is portable. The pressure vessel may be modular so that scale-up is conveniently achieved by adding more pressure vessels in parallel. For example, there may be 1, 2, 3, or more individual pressure vessels in an overall system. The product of one pressure vessel may become the reactant of a second pressure vessel in series, for example.

The disclosed pressure vessel and principles of the invention may be adapted for use in the processes and systems disclosed in commonly owned U.S. Patent App. Pub. No. 20210069609 A1, published on Mar. 11, 2021, which is hereby incorporated by reference herein. For example, some embodiments may utilize supercritical carbon dioxide as a solvent. The principles described herein, those described in U.S. Patent App. Pub. No. 20210069609 A1, or a combination thereof provide systems and methods that significantly improve upon the low throughput rates associated with the prior art.

Some embodiments are suitable for recovering one or more products from a starting biomass material. A wide variety of biomass materials may be processed, including but not limited to botanical feedstocks. Botanical feedstocks may include whole plants, plant herbs, plant roots, plant flowers, plant fruits, plant leaves, plant seeds, plant beans, and combinations thereof. The biomass material may itself be a botanical product (available on the market) that may be further processed to recover a higher-value product. Other types of biomass materials that may be processed according to this disclosure include starchy biomass (e.g., corn or wheat); lignocellulosic biomass including agricultural residues (e.g., corn stover or wheat straw), hardwoods, or softwoods; energy crops; or municipal solid waste, for example.

The products that may be extracted from a starting biomass material also vary widely, depending on the selection of biomass. As just one example, a cannabidiol product may be extracted from hemp. As another example, essential oils may be extracted from citrus peels. As another example, lignin may be extracted from pretreated lignocellulosic biomass. Process operating parameters including extraction pressure, extraction temperature, extraction time, and extraction solvent may be adjusted to maximize the process efficiency and to target specific desired compounds.

In various embodiments utilizing extraction, an extraction solvent is selected from the group consisting of carbon dioxide, alkanes (e.g., propane, isobutane, or n-hexane), alkenes (e.g., ethylene or cyclohexene), alcohols (e.g., ethanol or isobutanol), water, and combinations thereof. In some embodiments, the extraction solvent is liquid carbon dioxide, supercritical carbon dioxide, or a combination thereof. In some preferred embodiments, the extraction solvent is supercritical carbon dioxide.

The extraction solvent may be selected from the group consisting of carbon dioxide ($CO_2$), $C_1$-$C_4$ hydrocarbons (e.g., methane, ethane, ethylene, propane, propylene, or n-butane), $C_1$-$C_4$ oxygenates (e.g., methanol, ethanol, or acetone), and combinations thereof. For purposes of this disclosure, derivatives of hydrocarbons or oxygenates, in which one or more hydrogen atoms are replaced by other elements or functional groups, are included.

In some embodiments, the extraction solvent includes or consists essentially of carbon dioxide. The carbon dioxide may be in a supercritical state within the process chamber. Alternatively, or additionally, the carbon dioxide may be in a liquid state within the process chamber. Solid carbon dioxide (also known as dry ice) may be loaded into the process chamber.

Dilution gases may be included with the extraction solvent. For example, inert gases such as Ar or $N_2$ may be present along with $CO_2$, in an exemplary solvent.

In some embodiments, the process-chamber pressure (extraction pressure) is selected from about 50 bar to about 500 bar. In various embodiments, the extraction pressure is about, at least about, or at most about 1, 2, 3, 4, 5, 10, 15, 20, 25, 30, 40, 50, 60, 70, 80, 90, 100, 150, 200, 250, 300, 350, 400, 450, 500, 600, 700, 800, or 900 bar, for example.

The extraction time may be from about 0.1 minute to about 1 hour, for example. In various embodiments, the extraction time is about, at least about, or at most about 0.1, 0.2, 0.3, 0.4, 0.5, 1, 2, 3, 4, 5, 10, 15, 20, 25, 30, 40, 50, or 60 minutes, for example. The extraction time refers to the amount of time needed for the extraction to take place, once the extraction pressure and temperature are reached.

An extraction process may be carried out at an extraction temperature from about −50° C. to about 100° C., for example. In various embodiments, the extraction temperature is about, at least about, or at most about −40° C., −30° C., −20° C., −10° C., 0° C., 10° C., 20° C., 25° C., 30° C., 40° C., 50° C., 55° C., 60° C., 65° C., 70° C., 80° C., 90° C., or 95° C.

An extraction process may utilize a plurality of different pressures and/or temperatures, if desired, such as to target different compounds that have optimal extraction efficiencies at different conditions. For example, extraction may be conducted for a first period of time (e.g., 1 minute) at a first pressure (e.g., 100 bar) and a first temperature (e.g., 50° C.) followed by extraction at a second period of time (e.g., 2 minutes) at a second pressure (e.g., 200 bar) and a second temperature (e.g., 40° C.).

Certain embodiments utilize multiple process chambers that may each be operated at distinct extraction conditions. For example, a sequence of process chambers may be used in which the processed material from a first chamber, or a portion of the processed material (e.g., following a separation of solvent or biomass), becomes the feed material to a second process chamber.

The ratio of extraction solvent to biomass material may be selected from about 1 to about 20 on a mass basis, for example. In various embodiments, the ratio of extraction solvent to biomass material is about, at least about, or at most about 1, 2, 3, 4, 5, 6, 7, 8, 9, 10, 11, 12, 13, 14, 15, 16, 17, 18, 19, or 20, for example.

The process chamber may be agitated in a variety of ways. In some embodiments, the process chamber is disposed in physical communication with an external vibrating motor that physically vibrates the process chamber to mix the contents. In some embodiments, the process chamber is configured with a stirring mechanism such as an internal impeller or paddle. In some embodiments, the process chamber is agitated by rolling or tumbling the process chamber in an automated manner within the overall system. In some embodiments, the process chamber is agitated via continuous recycling of extraction solvent that is pumped out of and back into the process chamber. In similar embodiments, continuous recirculation of an inert gas (such as Ar or $N_2$) through the process chamber may be employed to enhance the mixing efficiency. Combinations of any of these agitation techniques, or others (e.g., sonication), may be employed in certain embodiments.

The specific agitation rate is not regarded as critical to the invention, and one skilled in the art will be able to employ an effective agitation rate. For example, in the case of an external vibrating motor, the vibration frequency may be monitored or controlled. In the case of an internal impeller, the impeller revolution frequency (e.g., revolutions per minute, rpm) may be monitored or controlled. In the case of a continuous purge and reinjection of fluid or another gas, the recycle flow rate may be monitored or controlled, and so on. For any type of agitation, the fluid Reynolds Number (Re) may be monitored, estimated, or controlled, such as by use of tracers to measure velocity distribution within the pressure vessel. The Re may be based on the process chamber diameter or on the impeller diameter in the case of an internal impeller, for example. In various embodiments, an effective internal Re may be from about 100 to about 10,000, for example. The flow pattern within the process chamber may be laminar or turbulent. In some embodiments, a non-agitated process chamber (Re=0) is employed.

The system preferably includes a process chamber subsystem for adjusting temperature, pressure, and/or residence time within the process chamber. A reactor control subsystem may be configured to vary parameters during extraction, such as over a prescribed protocol, or in response to measured variables. For example, an unintended change in process chamber pressure may be compensated by a change in process chamber temperature and/or residence time. As another example, temperature may be maintained constant (isothermal operation) or pressure may be maintained constant (isobaric operation). The process chamber subsystem may utilize well-known control logic principles, such as feedback control and feedforward control. Control logic may incorporate results from previous experiments or production campaigns. One example of a process chamber subsystem is MasterLogic Programmable Logic Controller from Honeywell (Morris Plains, New Jersey, U.S.).

In some embodiments, the system further comprises a safety release line (adapted to a fitting) that is activated when the pressure within the process chamber reaches or exceeds a predetermined pressure, such as a pressure selected from 500 bar to 2000 bar that is higher than the desired extraction pressure within the process chamber.

Other safety considerations may be applied to the system and methods. The process chamber subsystem mentioned above may include protective devices that automatically shut down the operation, when the temperature or pressure exceeds a maximum value. Practical safety-related design may be built into the system as well. Those skilled in the art will understand how to design safe pressure vessels.

It should be understood that the present invention is by no means limited to extraction using carbon dioxide ($CO_2$), or even to extraction—the pressure vessel may be utilized for a chemical reaction or a physical reaction as well. An operator may desire to introduce other solvents or reactants to make products that are not easily recoverable by liquid or supercritical $CO_2$. Other solvents may be used alone or as cosolvents in combination with liquid or supercritical $CO_2$. Various reactants and catalysts may be used, with or without a solvent. Theoretically, the principles of this disclosure may be employed in a pressure vessel that does not cause extraction or reaction, but rather another process, such as separation, distillation, heat exchange, material storage, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A pressure vessel comprising:

a chamber configured for processing a material in a chamber volume under a chamber pressure selected from greater than 1 bar to about 5000 bar, wherein said chamber is a cylindrical collection tube having a cylinder axis;

a first end cap disposed at one end of said pressure chamber;

a first interior seal plate disposed between said first end cap and said chamber volume; and a plurality of first pressure-vessel keys disposed between (a) said first end cap and (b) a first key ring configured to hold said first pressure-vessel keys in place, wherein each interface between each of said plurality of said first pressure-vessel keys and said first key ring has a first ring surface and a first top key surface, and wherein each interface between each of said plurality of said first pressure-vessel keys and said first end cap has a first bottom key surface and a first cap surface, wherein each of said first pressure-vessel keys are individually removable from said pressure vessel;

wherein at a chamber pressure greater than atmospheric pressure, said first end cap passively exerts contiguous forces against each of said first pressure-vessel keys and said first key ring to automatically and reversibly actuate a first pressure-vessel seal by reducing clearance between said first end cap and each of said first pressure-vessel keys, wherein, for each of said plurality of first pressure-vessel keys, (a) said first ring surface, (b) said first top key surface, (c) said first bottom key surface, and (d) said first cap surface are all parallel to each other and are all disposed at an angle, neither parallel nor perpendicular, with respect to said cylinder axis; and wherein at a chamber pressure of atmospheric pressure or less, said first pressure-vessel keys are individually removable from said first key ring, whereby said first end cap is consequently removable, wherein said first pressure-vessel keys are removable without tooling;

wherein said first end cap is removable without tooling;

wherein said first interior seal plate is removable without tooling;

wherein at said chamber pressure of atmospheric pressure or less, the clearance between said first pressure-vessel keys and (a) said first end cap and/or (b) said first key ring is at least 0.015 inch;

wherein said pressure vessel further comprises a first seal-plate piston seal disposed on the outside diameter of said first interior seal plate;

wherein said pressure vessel further comprises a first end-cap piston seal disposed on the outside diameter of said first end cap;

wherein said first end cap and said first interior seal plate form an integrated piece;

wherein said pressure vessel further comprises one or more first fittings disposed within said first interior seal plate;

and wherein said pressure vessel is contained within a system configured for reaction and/or extraction of a biomass feedstock utilizing supercritical carbon dioxide.

2. The pressure vessel of claim 1, wherein said plurality of first pressure-vessel keys is at least 4.

3. The pressure vessel of claim 1, wherein said plurality of first pressure-vessel keys is at least 8.

4. The pressure vessel of claim 1, wherein said plurality of first pressure-vessel keys is at least 12.

5. The pressure vessel of claim 1, said pressure vessel further comprising:

a second end cap disposed at the opposite end of said chamber;

a second interior seal plate disposed between said second end cap and said chamber volume; and a plurality of second pressure-vessel keys disposed between (a) said second end cap and (b) a second key ring configured to hold said second pressure-vessel keys in place, wherein each interface between each of said plurality of said second pressure-vessel keys and said second key ring has a second ring surface and a second top key surface, and wherein each interface between each of said plurality of said second pressure-vessel keys and said second end cap has a second bottom key surface and a first second cap surface, wherein each of said second pressure-vessel keys are individually removable from said pressure vessel;

wherein at said chamber pressure greater than atmospheric pressure, said second end cap passively exerts second contiguous forces against each of said second pressure-vessel keys and said second key ring to automatically and reversibly actuate a second pressure-vessel seal by reducing clearance between said second end cap and each of said second pressure-vessel keys, wherein, for each of said plurality of second pressure-vessel keys, (a) said second ring surface, (b) said second top key surface, (c) said second bottom key surface, and (d) said second cap surface are all parallel to each other and are all disposed at an angle, neither parallel nor perpendicular, with respect to said cylinder axis; and wherein at said chamber pressure of atmospheric pressure or less, said second pressure-vessel keys are individually removable from said second key ring, whereby said second end cap is consequently removable.

6. The pressure vessel of claim 5, wherein said second pressure-vessel keys are removable without tooling, and wherein said second end cap is removable without tooling.

7. The pressure vessel of claim 1, wherein said chamber pressure is selected from greater than 1 bar to about 1000 bar.

8. The pressure vessel of claim 1, wherein said chamber pressure is selected from about 5 bar to about 5000 bar.

9. The pressure vessel of claim 1, wherein said chamber pressure is selected from about 10 bar to about 2000 bar.

* * * * *